United States Patent
Urai et al.

[11] Patent Number: 5,855,419
[45] Date of Patent: Jan. 5, 1999

[54] PROCESS FOR CONTROLLING A DISTRIBUTION OF BRAKING FORCE IN A VEHICLE

[75] Inventors: Yoshihiro Urai; Yoichi Sugimoto, both of Wako, Japan

[73] Assignee: Honda Giken Kogyo Kabushiki Kaisha, Tokyo, Japan

[21] Appl. No.: 665,636

[22] Filed: Jun. 19, 1996

[30] Foreign Application Priority Data

Jun. 20, 1995 [JP] Japan .................................. 7-153651

[51] Int. Cl.$^6$ .................................. B60T 8/26; B60T 8/32
[52] U.S. Cl. .................. 303/9.69; 303/186; 303/DIG. 7; 303/9.71
[58] Field of Search .................. 303/9.69, 9.71, 303/146, 155, 166, 177, 183, 186, DIG. 1–4, 22.1, DIG. 7, DIG. 6, 191

[56] References Cited

U.S. PATENT DOCUMENTS

| | | | |
|---|---|---|---|
| 5,015,042 | 5/1991 | Yoshino | 303/146 X |
| 5,544,950 | 8/1996 | Burg et al. | 303/165 |
| 5,577,812 | 11/1996 | Hirano et al. | 303/165 X |

FOREIGN PATENT DOCUMENTS

| | | |
|---|---|---|
| 51-26584 | 8/1976 | Japan . |
| 6-144718 | 5/1994 | Japan . |

*Primary Examiner*—Josie Ballato
*Attorney, Agent, or Firm*—Nikaido Marmelstein Murray & Oram LLP

[57] ABSTRACT

In a process for controlling a braking-force distribution in a vehicle for front and rear wheel brakes by regulating a braking liquid pressure for at least one of front wheel brakes and rear wheel brakes, based on a comparison of a rear wheel speed and a wheel speed difference target value and a difference between a front wheel speed, amounts of load variation on the front and rear wheels are calculated during braking. Correction values, corresponding to an amount of wheel diameter varied from a preset wheel diameter as a result of the displacement of the loads, are determined based on the amount of load variation. At least one of the front and rear wheel speeds is corrected by the correction values. Thus, the braking-force distribution to the front and rear wheel brakes is controlled so that the braking force is sufficient in either of the front wheels or the rear wheels due to the variation in load during braking.

6 Claims, 4 Drawing Sheets

PROCESS FOR CONTROLLING A DISTRIBUTION OF BRAKING FORCE IN A VEHICLE

BACKGROUND OF THE INVENTION

1. Field of the Invention

The present invention relates to a process for controlling a distribution of braking force in a vehicle for front and rear wheel brakes by regulating a braking liquid pressure for at least the rear wheel brakes based on a comparison of a wheel speed difference target value and a difference between front and rear wheel speeds.

2. Description of the Related Art

Techniques are conventionally know, from Japanese Patent Publication No. 51-26584, Japanese Patent Application Laid-open No. 6-144178and the like, in which a front and rear braking-force distribution control is carried out so as to eliminate the difference between the front and rear wheels, thereby achieving an idel braking-force distribution.

In the above know techniques, optimal braking forces, corresponding to loads applied to the front and rear wheels, are provided by controlling the front and rear braking-force distribution so as to eliminate the difference between the front and rear wheel speeds. This is based on the following principle: When a braking force is generated for a tire receiving a vertical drag force N from a road surface, a slip rate 80 of the tire is represented, for simplicity, in a very small region by the following equation:

$$\lambda = K \times (B/N) \text{ (wherein K is a constant)}$$

The ideal braking-force distribution is to ensure that the front and rear wheel braking forces are proportional to the vertical drag force. Therefore, the front and rear wheel slip rates 80 may be equalized. Thus, if the vehicle speed is represented by $V_v$ and the wheel speed is represented by $V_w$ the slip rate $\lambda$ is determined according to the following equation:

$$\lambda = (V_v - V_w)/V_v$$

Therefore, if the braking-force distribution is controlled such that the front and rear wheel speeds VW become equal to each other, the front and rear wheel slip rates $\lambda$ can be equalized. More specifically, the rear wheel speed $V_w$ is controlled such that the rear wheel speed $V_w$ becomes equal to the front wheel speed $V_w$.

It is difficult to directly measure the wheel speeds $V_w$. In the existing circumstances, a rotational speed $\omega$ of a tire is detected by a rotational speed sensor, such as an electromagnetic pick-up. If a dynamic radius of the tire is represented by r, a wheel speed $V_w$ is calculated according to the following equation:

$$V_w = r \times \omega$$

However, the dynamic radius r varies depending upon various conditions such as air pressure in the tire, load, vehicle speed and the like. Therefore, unless the dynamic radius r is connected for the variations in the conditions this method fails to provide a highly accurate wheel speed $V_w$.

A technique is known in which the correction of the wheel diameters is carried out during traveling of the vehicle at a constant speed, before the control of the front and rear braking-force distribution is carried out. If the correction is only carried out in this manner however, it is impossible to accommodate the variation in dynamic radius r due to the displacement of the load during speed-reduction due to braking. That is, during speed-reduction of the vehicle, the dynamic radius r is smaller for the front wheel and larger for the rear wheel due to the displacement of the load caused by speed-reduction. Hence, there is a possibility that the slip rate of the rear wheel is apparently large relative to the slip rate of the front wheel, and the braking-force distribution ratio for the rear wheel is too small relative to an appropriate value as a result of the control of the front and rear braking-force distribution.

SUMMARY OF THE INVENTION

Accordingly, it is an object of the present invention to provide a process for controlling the braking-force distribution in a vehicle, wherein a front and rear braking-force distribution can be controlled, while avoiding an inappropriate braking-force distribution being provided in either of the front or rear wheels due to a variation in load during braking.

To achieve the above object, according to the present invention, there is provided a process for controlling a braking-force distribution in a vehicle for front and rear wheel brakes by regulating a braking liquid pressure for at least the rear wheel brakes among the front and rear wheel brakes, based on a comparison of a wheel speed difference target value and a difference between front and rear wheel speeds. The process comprises the steps of: first, calculating an amount of load variation on the front and rear wheels during braking. Based on the amount of load variation, correction values are determined which correspond to the amount of variation in the wheel diameters from preset wheel diameters caused by the variations in the load. At least one of the front wheel speeds and the rear wheel speeds is corrected by the correction values. Thus, it is possible to accurately calculate the difference between the front and rear wheel speeds despite the variation in load. Hence, even if control of the front and rear braking-force distribution is carried out, an appropriate braking force can be provided in any of the front and rear wheels.

According to another aspect and feature of the present invention, a deceleration of a vehicle body is detected, and the amount of load variation is calculated based on the detected deceleration. Thus, the braking-force distribution ratio for the rear wheels will not be too small relative to an appropriate value during the control of the front and rear braking-force distribution, despite the variation in load due to the displacement of the load as a result of speed-reduction of the vehicle body during braking.

According to a further aspect and feature of the present invention, the amount of load variation on the front and rear wheels is calculated based on a detected deceleration of a vehicle body. The braking-force distribution to the front and rear wheel brakes is controlled on both the left and right sides, based on comparisons, on both the left and right sides, of the wheel speed difference target value and the difference between the front and rear wheel speeds. Thus, even if the load varies as a result of turning of the vehicle, the control of the front and rear braking-force distribution can be carried out.

According to a further aspect and feature of the present invention, the amount of load variation on the front and rear wheels is calculated based on a detected deceleration of the vehicle body. The front and rear braking-force distribution is controlled for the left wheels and for the right wheels, based on comparison of the difference between the front wheel speed and the rear wheel speed and the wheel speed difference target value. Thus, it is possible to enhance the stability of the vehicle body by conducting the control of the front and rear braking-force distribution by determining the amount of load variation based on the deceleration of the vehicle body on the left and right sides of the vehicle and correcting the wheel speeds.

The above and other objects, features and advantages of the invention will become apparent from the following detailed description of a preferred embodiment taken in conjunction with the accompanying drawings.

DETAILED DESCIPTION OF THE PREFERRED EMBODIMENT

With reference to the accompanying drawings, the present invention will now be described by way of an embodiment in which the invention is applied to a front wheel drive vehicle.

Figure 1:
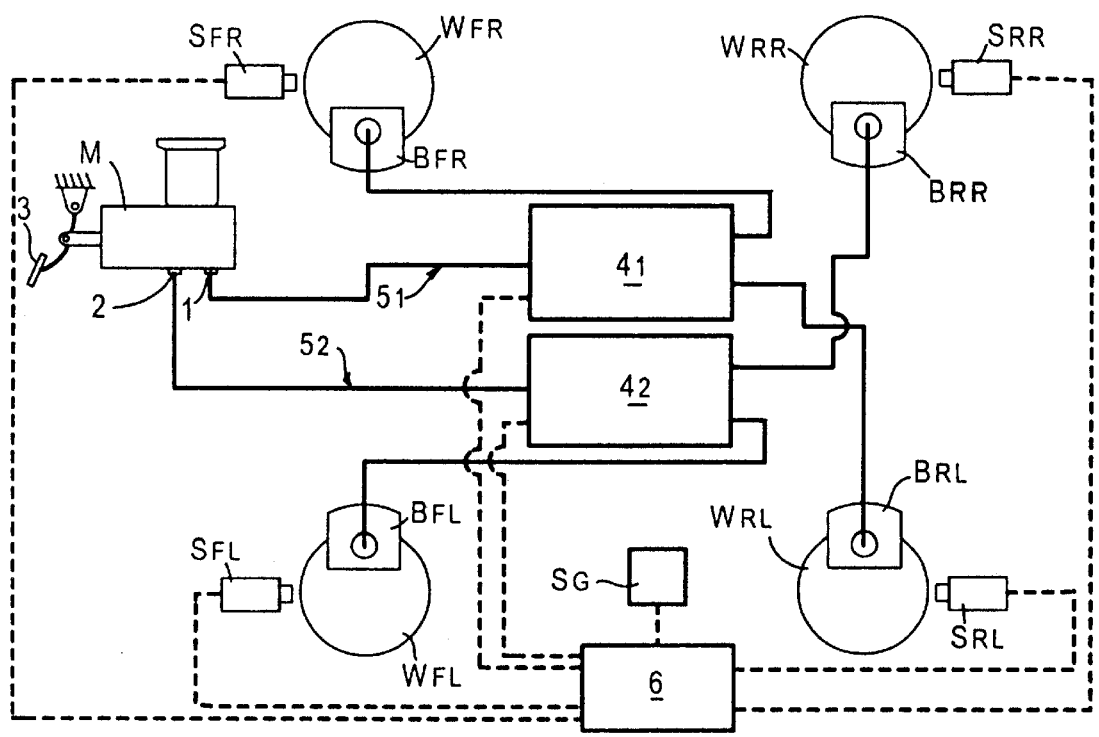
FIG. 1 is a diagrammatic illustration of a liquid pressure circuit of a brake system according to an embodiment of the present invention.

Referring first to FIG. 1, a brake pedal 3 is operatively connected to a tandem-type master cylinder M having first and second output ports 1 and 2, such that independent braking liquid pressures are output from the first and second output ports 1 and 2 in the master cylinder M in response to the depression of the brake pedal 3. A first braking liquid pressure system $5_1$, including a braking pressure regulating means $4_1$, is connected to the first output port 1. A right front wheel brake $B_{FR}$ mounted on a right front wheel $W_{FR}$ and a left rear wheel brake $B_{RL}$ mounted on a left rear wheel $W_{RL}$ are connected to the first braking liquid pressure system $5_1$. A second braking liquid pressure system $5_2$, including a braking pressure regulating means $4_2$, is connected to the second output port 2. A left front wheel brake $B_{FL}$ mounted on a left front wheel $W_{FL}$ and a right rear wheel brake $B_{RR}$ mounted on a right rear wheel $W_{RR}$ are connected to the second braking liquid pressure system $5_2$. Each of the brakes $B_{FL}$, $B_{FR}$, $B_{RL}$ and $B_{RR}$ exhibits a braking force corresponding to a braking liquid pressure applied thereto. Each brake, for example, may be a disk brake.

Rotational speeds of the left and right front wheels $W_{FL}$ and $W_{FR}$ are detected by left and right wheel rotational speed sensors $S_{FL}$ and $S_{FR}$, respectively. Rotational speeds of the left and right rear wheels $W_{RL}$ and $W_{RR}$ are detected by left and right wheel rotational speed sensors $S_{RL}$ and $S_{RR}$, respectively. Deceleration of the vehicle body is detected by a deceleration sensor $S_G$. Detection values detected by the rotational speed sensors $S_{FL}$, $S_{FR}$, $S_{RL}$ and $S_{RR}$ and the deceleration sensor $S_G$ are input to an electronic control unit 6. The electronic control unit 6 controls the operation of the braking pressure regulating means $4_1$ and $4_2$ based on the detection values detected by the rotational speed sensors $S_{FL}$, $S_{FR}$, $S_{RL}$ and $S_{RR}$ and the deceleration sensor $S_G$.

Figure 2:
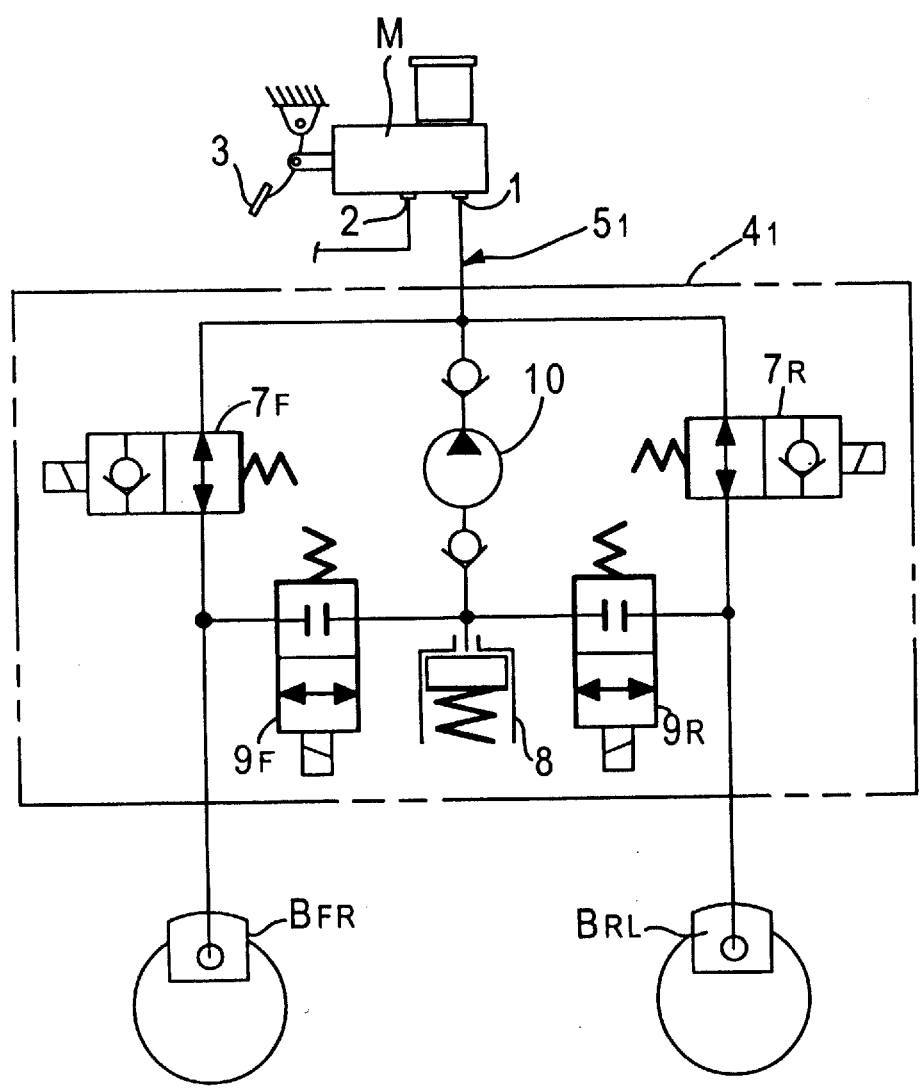
FIG. 2 is a diagrammatic illustration of the arrangement of a braking pressure regulating means.

Referring to FIG. 2, the braking pressure regulating means $4_1$ in the first braking liquid pressure system $5_1$ is a conventionally well-known antilock brake control system which includes a) an electromagnetic supply valve $7_F$ for permitting a braking liquid pressure, output from the first output port 1 in the master cylinder M, to be applied to the right front wheel brake $B_{FR}$, b) an electromagnetic supply valve $7_R$ for permitting a braking liquid pressure, output from the first output port 1, to be applied to the left rear wheel brake $B_{RL}$, c) a reservoir 8, d) an electromagnetic release valve $9_F$ capable of releasing the braking liquid pressure for the right front wheel brake $B_{FR}$ to the reservoir 8, e) an electromagnetic release valve $9^R$ capable of releasing the braking liquid pressure for the left rear wheel brake $B_{RL}$ to the reservoir 8, and f) a liquid pressure pump 10 capable of returning a working liquid pumped from the reservoir 8 toward the first output port 1. Each of the electromagnetic supply valves $7_F$ and $7_R$ is capable of being switched between a deenergized state in which the first output port 1 and each of the wheel brakes $B_{FR}$ and $B_{RL}$ communicates with each other, and an energized state in which the flow of the braking liquid from the first output port 1 to each of the wheel brakes $B_{FR}$ and $B_{RL}$ is cut off, but the flow of the braking liquid from each of the wheel brakes $B_{FR}$ and $B_{RL}$ to the first output port 1 is not cut off. Each of the electromagnetic release valves $9_F$ and $9_R$ is capable of being switched between a deenergized state in which each of the wheel brakes $B_{FR}$ and $B_{RL}$ and the reservoir is out of communication with each other, and an energized state in which each of the wheel brakes $B_{FR}$ and $B_{RL}$ and the reservoir 8 communicate with each other.

In such a braking pressure regulating means $4_1$, the antilock brake control of the right front wheel brake $B_{FR}$ and the left rear wheel brake $B_{RL}$ can be performed and, the distribution of the braking force to the right front wheel brake $B_{FR}$ and the left rear wheel brake $B_{RL}$ can be regulated, by the control of the electromagnetic supply valves $7_F$ and $7_R$ and the electromagnetic release valves $9_F$ and $9_R$.

The braking pressure regulating means $4_2$ in the second braking liquid pressure system $5_2$ is constructed in the same manner as is the braking pressure regulating means $4_1$. Thus, the antilock brake control of the left front wheel brake $B_{FL}$ and the right rear wheel brake $B_{RR}$ can be performed, and the distribution of the braking force to the left front wheel brake $B_{FL}$ and the right rear wheel brake $B_{RR}$ can be regulated.

Figure 3:
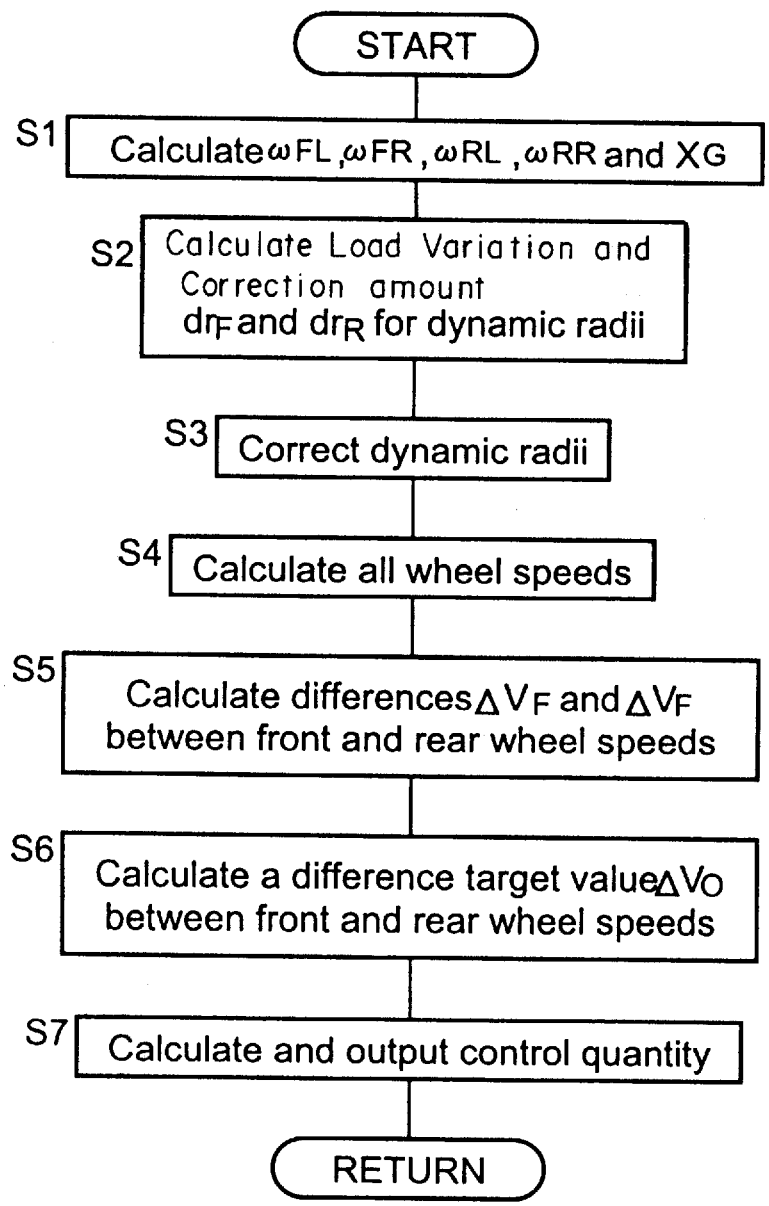
FIG. 3 is a flow chart illustrating a procedure for the control of a braking-pressure distribution.

In the electronic control unit 6, a control calculation is carried out according to a procedure shown in FIG. 3. First, at step S1, rotational speeds $\omega_{FL}$ and $\omega_{FR}$ of the left and right front wheels and rotational speeds $\omega_{RL}$ and $\omega_{RR}$ of the left and right rear wheels as well as a deceleration $X_G$ of the vehicle body are calculated. At step S2, the calculation of a dynamic radius correction quantity is carried out.

Figure 4:
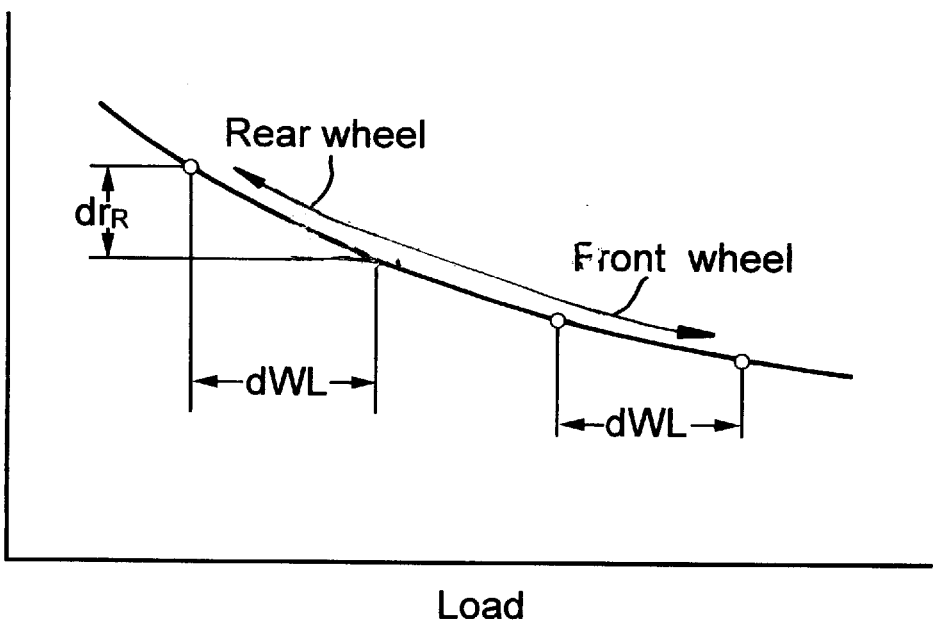
FIG. 4 is a diagram illustrating the variation in dynamic radius caused by the variation of the load on front and rear wheels.

The load on the wheel is increased for the front wheels and decreased for the rear wheels, with a deceleration occurring in the vehicle during braking. The amount dWL of load variation is represented by the following equation:

$$dWL = (½) \times (H/L) \times m \times X_G$$

wherein H represents a height of the center of gravity of the vehicle body; L represents a length of the wheel base; and m represents a weight of the vehicle body. Thus, the amount dWL of load variation is proportional to the deceleration $X_G$ of the vehicle body. During deceleration the load is increased on the front wheels and decreased on the rear wheels. Therefore, the dynamic radii $r_F$ of the left and right front wheels become small, and the dynamic radii $r_R$ of the left and right rear wheels become large. The amount of variation for the dynamic radii $r_F$ and $r_R$, i.e., correction amounts $dr_F$ and $dr_R$ have the following relationship to the amount dWL of load variation (see FIG. 4):

$$dr_F = f_F(dWL)$$

$$dr_R = f_R(dWL)$$

wherein the functions, $f_F$ (dWL) and $f_R$ (dWL) are determined by characteristics of the tires. If (½)×(H/L)×m=K, the following equations are established:

$$dr_F = f_F(K \times X_G)$$

$$dr_R = f_R(K \times X_G)$$

At step S3, the calculation for correcting the dynamic radii is performed to provide corrected dynamic radii $r_F'$ and $r_R'$ according to the following equations:

$$r_F' = r_F - dr_F = r_F - f_F(K \times X_G)$$

$$r_R' = r_R + dr_R = r_F + f_R(K \times X_G)$$

At step S4, wheel speeds of all the wheels $W_{FL}$, $W_{FR}$, $W_{RL}$ and $W_{RR}$ are calculated. More specifically, a left front wheel speed $V_{WFL}$, a right front wheel speed $V_{EFR}$, a left rear wheel speed $V_{WRL}$ and a right rear wheel speed $V_{WRR}$ are calculated according to the following equations:

$$V_{WFL} = r_F' \times \omega_{FL}$$

$$V_{WFR} = r_F' \times \omega_{FR}$$

$$V_{WRL} = r_R' \times \omega_{FL}$$

$$V_{WRR} = r_R' \times \omega_{RR}$$

At step S5, differences $\Delta V_L$ and $\Delta V_R$ between the left and right front wheels and between the left and right rear wheels are calculated according to the following equations:

$$\Delta V_L = V_{WRL} - V_{WFL}$$

$$\Delta V_R = V_{WRR} - V_{WFR}$$

At step S6, a target value $\Delta V_0$ for the difference between the front and rear wheel speeds is calculated according to the following equation:

$$\Delta V0 = \lambda \times V_v - d$$

wherein $V_V$ is a vehicle speed which is provided by filtering of an average value of the left and right rear wheel speeds $V_{WRL}$ and $V_{WRR}$; and each of $\lambda$ and d is a constant value. A braking force distribution control is carried out for increasing the rear wheel speeds, i.e., for increasing the braking forces of the front wheels if the target value $\Delta V_0$ of the difference between the front and rear wheel speeds is increased.

At step S7, the calculation of control quantities of the braking pressure regulating means $4_1$ and $4_1$ is conducted. More specifically, when $\Delta V_R > \Delta V_0$ and $\Delta V_L > \Delta V_0$, this indicates a condition that the rear wheel speeds $V_{WRL}$ and $V_{WRR}$ are too fast. In this case, the control quantity is determined so as to increase the braking force for the rear wheels. On the other hand, when $\Delta V_R < \Delta V_0$ and $\Delta V_L < \Delta V_0$, this indicates a condition that the rear wheel speeds $V_{WRL}$ and $V_{WRR}$ are too slow. In this case, the control quantity is determined so as to decrease the braking force for the rear wheels.

The operation of this embodiment will be described below. During braking, the amount dWL of load variation for each of the front wheels $W_{FL}$ and $W_{FR}$ and the rear wheels $W_{RL}$ and $W_{RR}$ is calculated. The wheel speeds of the front wheels $W_{FL}$ and $W_{FR}$ and the rear wheels $W_{RL}$ and $W_{RR}$ are corrected by the correction values $dr_F$ and $dr_R$ determined based on respective amount dWL of load variation. In other words, the set dynamic radii $r_F$ and $r_R$ of the wheels $W_{FL}$, $W_{FR}$, $W_{RL}$ and $W_{RR}$ are corrected by the correction values $dr_F$ and $dr_R$, and wheel speeds $V_{FL}$, $V_{FR}$, $V_{RL}$ and $V_{RR}$ are calculated based on the corrected dynamic radii $r_F'$ and $r_R'$. Therefore, despite the variation in load, differences $\Delta V_L$ and $\Delta V_R$ between the front and rear wheel speeds are accurately calculated. Thus, even if the control of the braking-force distribution to the front and rear wheel brakes is conducted, an appropriate braking force can be provided in any of the front and rear wheels.

The amount dWL of load variation is determined based on the detected deceleration $X_G$. Therefore, despite the variation in load due to the displacement of the load caused by the reduction in speed of the vehicle during braking, even if the control of the braking-force distribution to the front and rear wheel brakes is conducted, a resulting braking force distribution ratio will not become excessively smaller than an appropriate value, thereby insuring the appropriate distribution of the braking force to the front and rear wheels.

The correction based on the amount of load variation determined based on the deceleration $X_G$ of the vehicle body is carried out for each of the left and right sides of the vehicle. The control of the braking-force distribution based on the comparison of the wheel speed difference target value with the wheel speed differences $\Delta V_L$ and $\Delta V_R$ accurately calculated is carried out for each of the opposite sides of the vehicle. Thus, it is possible to enhance the stability of the vehicle body.

In the embodiment, both the wheel speeds $V_{WFL}$ and $V_{WFR}$ of the front wheels $W_{WFL}$ and $W_{WFR}$ and the wheel speeds $V_{WRL}$ and $V_{WRR}$ of the rear wheels $W_{WFL}$ and $W_{WFR}$ have been corrected. However, in the control of the braking-force distribution to the front and rear brakes, a relative change in front and rear wheel speeds relative to each other is important and hence, only one of the wheel speeds $V_{WFL}$ and $V_{WFR}$ of the front wheels $W_{WFL}$ and $W_{WFR}$ and the wheel speeds $V_{WRL}$ and $V_{WRR}$ of the rear wheels $W_{WFL}$ and $W_{WFR}$ may be corrected. In this case, the correction quantity dr is represented by the following equation:

$$dr = dr_F + dr_R = f_F(K \times X_G) + fR(K \times X_G)$$

For example, if the front wheel speeds are corrected and the rear wheel speeds are not corrected, then the dynamic radii $r_F'$ and $r_R'$ provided after the correction are represented by the following equation:

$$r_F' = r_F - dr = r_F - f_F(K \times X_G) - f_R(K \times X_G)$$

$$r_{R'} - r_R$$

As a further embodiment of the present invention, a lateral acceleration of the vehicle may be detected, and an amount of load variation may be determined based on the deceleration $X_G$ of the vehicle body and the lateral acceleration.

In this case, the load is increased on the side of the outer wheels and decreased on the side of the inner wheels by the generation of a lateral acceleration caused by the turning of the vehicle. If the amount of load variation on the front wheel side is represented by $dWL_F'$ and the amount of load varied on the rear wheel side is represented by $dWL_R'$, the amounts $dWL_F'$ and $dWL_R'$ of load variation are determined according to the following known equations:

$$dWL_F' = \frac{1}{b_F} \times \left( G_F \times \phi + \frac{m \times Y_G \times L_R}{L} \times h_F \right)$$

$$dWL_R' = \frac{1}{b_R} \times \left( G_R \times \phi + \frac{m \times Y_G \times L_F}{L} \times h_R \right)$$

$$\phi = \frac{m \times Y_G \times h_s}{G_G + G_R}$$

wherein $b_F$ is a tread of the front wheel; $b_R$ is a tread of the rear wheel; $G_F$ is a rolling rigidity of the front wheel; $G_R$ is a rolling rigidity of the rear wheel; $\Phi$ is a rolling angle; $Y_G$ is a lateral acceleration; $L_F$ is a length from the center of gravity to a front axle; $L_R$ is a length from the center of gravity to a rear axle; $h_F$ is a height of a center of rolling of the front wheel; $h_R$ is a height of a center of rolling of the rear wheel; and $h_s$ is a height from the center of gravity to a rolling axis.

In this manner, the amounts $dWL_F'$ and $dWL_R'$ of load variation on the front and rear wheels based on the lateral acceleration are provided, but an amount of load variation based on the deceleration $X_G$ and the lateral acceleration can be provided by adding each of such amounts $dWL_F'$ and $dWL_R'$ of load variation to the amount $dWL$ of load variation based on the deceleration $X_G$. Thus, it is possible to appropriately conduct the control of the braking-force distribution to the front and rear wheel brakes even if the amount of load variation is caused by turning of the vehicle. The control of the braking-force distribution is by correcting the wheel speeds by the correction values determined based on the amount of load variation.

The example using the antilock brake control system have been shown as the braking pressure regulating means, but a braking pressure regulating means capable of regulating only the liquid pressure for the rear wheel brakes may be used. Although the brake system of the X-piping type has been described in the above-described embodiment, the present invention is applicable to brake systems of any piping types. Further, the deceleration $X_G$ may be determined from the variations in wheel speeds.

Although the embodiments of the present invention have been described, it will be understood that the present invention is not limited to the above-described embodiments, and various modifications in design may be made without departing from the spirit and scope of the invention defined in claims.

What is claimed is:

1. A process for controlling a distribution of a braking force in a vehicle for front and rear wheel brakes by regulating a braking liquid pressure for at least the rear wheel brakes based on a comparison of a wheel speed difference target value and a difference between front and rear wheel speeds, said process comprising the steps of:

calculating an amount of load variation on each of the front and rear wheels during braking;

determining, based on each said amount of load variation, a correction value, for each of the front and rear wheels, corresponding to a variation in wheel diameter from a preset wheel diameter caused by variations of the load; and correcting at least one of the front wheel speeds and the rear wheel speeds by each said correction value.

2. A process for controlling a distribution of braking force in a vehicle according to claim 1, wherein a deceleration of a vehicle body is detected, and each said amount of load variation is calculated based on said deceleration.

3. A process for controlling a distribution of braking force in a vehicle according to claim 1, wherein each said amount of load variation on the front and rear wheels is calculated based on a detected deceleration of a vehicle body, and the braking-force distribution to the front and rear wheel brakes is controlled on both the left and right sides, based on comparisons, on both the left and right sides, of the wheel speed difference target value and said difference between the front and rear wheel speeds.

4. A process for controlling a distribution of braking force in a vehicle according to claim 1, wherein calculation of said amount of load variation is based upon a height of a center of gravity of a vehicle body, a length of a wheel base and a weight of the vehicle body.

5. A process for controlling a distribution of braking force in a vehicle according to claim 1, wherein said amount of load variation is proportional to deceleration of a vehicle body.

6. A processing for controlling a distribution of braking force in a vehicle according to claim 1, wherein said correction value is determined as a function of variation in load and deceleration of a vehicle body.

* * * * *